(12) United States Patent
Lim et al.

(10) Patent No.: US 10,483,767 B2
(45) Date of Patent: *Nov. 19, 2019

(54) THIN FILM COIL AND ELECTRONIC DEVICE HAVING THE SAME

(71) Applicant: WITS Co., Ltd., Yongin-si, Gyeonggi-do (KR)

(72) Inventors: Dae Ki Lim, Suwon-si (KR); Tae Sung Kim, Suwon-si (KR); Hyeon Gil Nam, Suwon-si (KR); Chan Gwang An, Suwon-si (KR); Hyun Seok Lee, Suwon-si (KR); Ki Won Chang, Suwon-si (KR); Chang Mok Han, Suwon-si (KR); Sang Woo Bae, Suwon-si (KR); Sung Eun Cho, Suwon-si (KR); Jae Suk Sung, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 379 days.

This patent is subject to a terminal disclaimer.

(21) Appl. No.: 14/859,885

(22) Filed: Sep. 21, 2015

(65) Prior Publication Data

US 2016/0013665 A1 Jan. 14, 2016

Related U.S. Application Data

(63) Continuation of application No. 13/533,560, filed on Jun. 26, 2012, now Pat. No. 9,165,708.

(30) Foreign Application Priority Data

Mar. 29, 2012 (KR) ........................ 10-2012-0032341

(51) Int. Cl.
*H01F 5/00* (2006.01)
*H02J 5/00* (2016.01)
(Continued)

(52) U.S. Cl.
CPC ................ *H02J 5/005* (2013.01); *H01F 5/00* (2013.01); *H01F 27/2804* (2013.01);
(Continued)

(58) Field of Classification Search
CPC ............................ H01F 5/00; H01F 27/00–36
(Continued)

(56) References Cited

U.S. PATENT DOCUMENTS 3,247,476 A 4/1966 Pintell
3,522,494 A 8/1970 Bosch
(Continued)

FOREIGN PATENT DOCUMENTS

GB 2 250 383 A 6/1992
JP 01310518 A 12/1989
(Continued)

OTHER PUBLICATIONS

Chinese Office Action dated Feb. 1, 2016 in counterpart Chinese Patent Application No. 201210189520.2 (pp. 1-14 in English; pp. 15-23 in Chinese).

(Continued)

*Primary Examiner* — Tuyen T Nguyen
(74) *Attorney, Agent, or Firm* — Harness, Dickey & Pierce, P.L.C.

(57) ABSTRACT

There are provided a thin film coil and an electronic device having the same, the thin film coil including a substrate; and a coil pattern including a first coil strand and a second coil strand formed on both surfaces of the substrate, respectively, wherein the first coil strand formed on one surface of the substrate includes at least one gyration path that passes through the other surface of the substrate and gyrates.

12 Claims, 6 Drawing Sheets

(51) Int. Cl.
- *H02J 50/70* (2016.01)
- *H02J 50/10* (2016.01)
- *H01F 27/28* (2006.01)
- *H01F 27/29* (2006.01)
- *H01F 38/14* (2006.01)
- *H02J 7/02* (2016.01)
- *H01Q 7/00* (2006.01)
- *H01Q 7/06* (2006.01)
- *H01F 17/00* (2006.01)

(52) U.S. Cl.
CPC ............. *H01F 27/29* (2013.01); *H01F 38/14* (2013.01); *H01Q 7/00* (2013.01); *H01Q 7/06* (2013.01); *H02J 7/025* (2013.01); *H02J 50/10* (2016.02); *H02J 50/70* (2016.02); *H01F 17/00* (2013.01); *H01F 17/0006* (2013.01); *H01F 2017/004* (2013.01); *H01F 2017/0053* (2013.01); *H01F 2017/0073* (2013.01); *H01F 2017/0086* (2013.01)

(58) Field of Classification Search
USPC .................................. 336/65, 192, 200, 232
See application file for complete search history.

(56) References Cited

U.S. PATENT DOCUMENTS

| | | |
|---|---|---|
| 4,313,152 A | 1/1982 | Vranken |
| 5,363,081 A | 11/1994 | Bando et al. |
| 5,701,067 A | 12/1997 | Kaji et al. |
| 6,002,161 A | 12/1999 | Yamazaki |
| 6,356,183 B1 | 3/2002 | Jou |
| 6,517,193 B2 | 2/2003 | Kimura |
| 7,248,480 B2 | 7/2007 | Chiba |
| 8,228,027 B2 | 7/2012 | Gao |
| 8,330,416 B2 | 12/2012 | Goma |
| 8,729,855 B2 | 5/2014 | Kobayashi et al. |
| 8,786,250 B2 | 7/2014 | Furuya et al. |
| 8,798,538 B2 | 8/2014 | Han et al. |
| 9,355,766 B2 * | 5/2016 | Han .......................... H01F 5/04 |
| 9,543,653 B2 * | 1/2017 | Han .......................... H01Q 1/38 |
| 9,812,256 B2 * | 11/2017 | Yang ....................... H02J 50/10 |
| 2002/0071003 A1 | 6/2002 | Kimura |
| 2004/0017179 A1 | 1/2004 | Wu |
| 2004/0227608 A1 | 11/2004 | Nakatani et al. |
| 2007/0182367 A1 | 8/2007 | Partovi |
| 2007/0247268 A1 | 10/2007 | Oya et al. |
| 2007/0296536 A1 | 12/2007 | Odahara et al. |
| 2008/0061735 A1 | 3/2008 | Toya et al. |
| 2008/0164840 A1 | 7/2008 | Kato et al. |
| 2008/0164844 A1 | 7/2008 | Kato et al. |
| 2008/0197963 A1 | 8/2008 | Muto |
| 2008/0278112 A1 | 11/2008 | Hui et al. |
| 2008/0309287 A1 | 12/2008 | Reed |
| 2009/0121819 A1 | 5/2009 | Haratani et al. |
| 2009/0140691 A1 | 6/2009 | Jung |
| 2009/0153229 A1 | 6/2009 | Hanke et al. |
| 2009/0251102 A1 | 10/2009 | Hui |
| 2010/0248623 A1 | 9/2010 | Haratani et al. |
| 2010/0253153 A1 | 10/2010 | Kondo et al. |
| 2010/0265159 A1 | 10/2010 | Ando et al. |
| 2010/0289450 A1 | 11/2010 | Kook |
| 2011/0018490 A1 | 1/2011 | Furuya et al. |
| 2011/0221385 A1 | 9/2011 | Partovi et al. |
| 2012/0187903 A1 | 7/2012 | Tabata et al. |
| 2012/0235636 A1 | 9/2012 | Partovi |
| 2012/0256585 A1 | 10/2012 | Partovi |
| 2012/0274148 A1 * | 11/2012 | Sung .................... H04B 5/0037 307/104 |
| 2012/0319647 A1 | 12/2012 | Itabashi et al. |
| 2013/0119927 A1 | 5/2013 | Partovi |
| 2013/0285604 A1 | 10/2013 | Partovi |
| 2013/0285605 A1 | 10/2013 | Partovi |
| 2013/0300355 A1 | 11/2013 | Jung |
| 2014/0103873 A1 | 4/2014 | Partovi et al. |
| 2014/0184151 A1 | 7/2014 | Han et al. |
| 2014/0217966 A1 | 8/2014 | Schneider et al. |
| 2014/0224267 A1 | 8/2014 | Levitz et al. |
| 2014/0239892 A1 | 8/2014 | Sawa et al. |

FOREIGN PATENT DOCUMENTS

| | | | |
|---|---|---|---|
| JP | 05081615 A | 4/1993 | |
| JP | 10255629 A | 9/1998 | |
| JP | 2000-182850 A | 6/2000 | |
| JP | 2005341577 A * | 12/2005 | ............... H03H 7/42 |
| JP | 2007-157985 A | 6/2007 | |
| JP | 2008-166391 A | 7/2008 | |
| JP | 2008-172872 A | 7/2008 | |
| JP | 2008172872 A * | 7/2008 | ......... H01F 27/2804 |
| JP | 2008-205215 A | 9/2008 | |
| JP | 4367487 B2 | 11/2009 | |
| JP | 2010040701 A * | 2/2010 | |
| JP | 2013-008859 A | 1/2013 | |
| KR | 200357251 Y1 | 7/2004 | |
| KR | 10-2010-0062741 A | 8/2010 | |
| TW | 200609961 A | 3/2006 | |
| WO | WO 2006/008878 A1 | 1/2006 | |

OTHER PUBLICATIONS

Korean Office Action dated Nov. 2, 2015 in counterpart Korean Application No. 10-2015-0146151 (pp. 1-6 in English, pp. 7-11 in Korean).
Korean Office Action for Application No. 10-2012-0032341 dated Apr. 26, 2013.
Japanese Office Action Issued in Application No. 2012-123508 dated Sep. 10, 2013.
Chinese Office Action dated May 20, 2015 for corresponding Chinese Patent Application No. 20121018950.2.
Korean Office Action dated May 28, 2015 for the corresponding Korean Patent Application No. 10-2015-0054774 (English translation pp. 1-6; Korean Office Action pp. 7-13).
Korean Office Action dated May 29, 2015 for the corresponding Korean Patent Application No. 10-2015-0054773 (English translation pp. 1-6; Korean Office Action pp. 7-13).
United States Office Action dated Feb. 8, 2018, in corresponding U.S. Appl. No. 15/645,092 (18 pages, in English).
Korean Office Action dated Aug. 10, 2018 in corresponding Korean Patent Application No. 10-2018-0087536 (10 pages in English and 8 pages in Korean).

* cited by examiner

THIN FILM COIL AND ELECTRONIC DEVICE HAVING THE SAME

CROSS-REFERENCE TO RELATED APPLICATIONS

This application is a continuation of U.S. Ser. No. 13/533,560 filed Jun. 26, 2012 which claims the priority of Korean Patent Application No. 10-2012-0032341 filed on Mar. 29, 2012, in the Korean Intellectual Property Office, the disclosures of which are incorporated herein by reference.

BACKGROUND

1. Field

The present disclosure relates to a thin film coil and an electronic device having the same, and more particularly, to a contactless power transfer apparatus capable of wirelessly transmitting power by using electromagnetic induction and a thin film coil used therefor.

2. Description of Related Art

Recently, in order to charge a rechargeable battery installed in a mobile terminal or the like, a system for wirelessly transmitting power, namely, in a contactless manner, has been under research.

In general, a contactless power transfer apparatus includes a contactless power transmission apparatus transmitting power and a contactless power reception apparatus receiving and storing power.

Such a contactless power transfer apparatus transmits and receives power by using electromagnetic induction, and to this end, each contactless power transfer apparatus includes a coil therein.

A related art contactless power transfer apparatus is configured to have a coil wound parallel to a bottom surface thereof (i.e., an external contact surface). Also, a coil may be configured to be fixed to a bottom surface by an adhesive, a bonding sheet, or the like.

However, in the related art, a general wire-type coil is employed. Thus, coils are wound in an overlapping, stacked manner. This may cause a defect in which the thickness of a contactless power transfer apparatus is increased due to the thickness of the coil and the number of windings of coils.

Thus, in order to keep up with the recent trend in which relatively thinner devices are preferred, a development of a thinner contactless power transfer apparatus is required.

Also, the related art largely uses a single line type coil, so an AC resistance value may be increased due to an eddy current, a skin effect, or the like, at a low frequency, to thereby cause loss.

SUMMARY

According to an aspect a thin film coil formed to be relatively thinner and an electronic device having the same are provided.

Another aspect provides a contactless power transfer apparatus having a significantly reduced thickness by using a thin film coil.

Another aspect provides a contactless power transfer apparatus capable of significantly reducing loss caused by an eddy current, a skin effect, or the like, at a low frequency.

According to an aspect, there is provided a thin film coil including: a substrate; and a coil pattern including a first coil strand and a second coil strand formed on both surfaces of the substrate, respectively, wherein the first coil strand formed on one surface of the substrate includes at least one gyration path that passes through the other surface of the substrate and gyrates.

The gyration path may share a portion of the second coil strand formed on the other surface of the substrate.

The gyration path may be formed as the first coil strand is connected to the second coil strand through a gyration via.

The at least one gyration path may include: two gyration vias electrically connecting the first coil strand and the second coil strand; and a shared section disposed between the two gyration vias of the second coil strand.

The thin film coil may further include: two contact pads disposed outwardly of the coil pattern and electrically connected to both ends of the coil pattern.

One end of the first coil strand may be electrically connected to the contact pad through a portion of one surface of the substrate corresponding to the gyration path.

The first coil strand and the second coil strand may be connected in parallel.

The second coil strand may include a conductive connection via formed to be disposed at each of both ends thereof and may be electrically connected to the first coil strand by the conductive connection via.

The first coil strand and the second coil strand may be disposed on portions of both surfaces of the substrate to which they correspond in a vertical direction.

According to another aspect, there is provided a thin film coil including: a substrate; a coil pattern including a first coil strand and a second coil strand formed on both surfaces of the substrate, respectively; and two contact pads disposed outwardly of the coil pattern and electrically connected to both ends thereof, wherein the first coil strand formed on one surface of the substrate includes: a spiral pattern; and a lead out pattern disposed to traverse the spiral pattern from one end disposed at an inner side of the spiral pattern so as to be electrically connected to the contact pad.

A portion of the spiral pattern of the first coil strand in which the lead out pattern is disposed may pass through the other surface of the substrate and the spiral pattern may gyrate based on the lead out pattern.

The gyrating portion of the first coil may share a portion of the second coil strand formed on the other surface of the substrate.

According to another aspect, there is provided an electronic device including: a contactless power transmission apparatus having a thin film coil including a first coil strand and a second coil strand formed on both surfaces of a substrate and connected in parallel, respectively, the first coil strand formed on one surface of the substrate including at least one gyration path that passes through the other surface of the substrate and gyrates; and a case accommodating the contactless power transmission apparatus therein.

The contactless power transmission apparatus may be directly attached to an inner surface of the case or disposed to be closer to the inner surface of the case.

The electronic device may further include: a battery storing power generated from the contactless power transmission apparatus.

The electronic device may further include: a voltage conversion unit converting alternating current (AC) power supplied from the outside into an AC voltage having a particular frequency and providing the converted AC voltage to the contactless power transmission apparatus.

BRIEF DESCRIPTION OF THE DRAWINGS

The above and other aspects, features and other advantages will be more clearly understood from the following detailed description taken in conjunction with the accompanying drawings, in which.

DETAILED DESCRIPTION OF THE EMBODIMENTS

Figure 1:
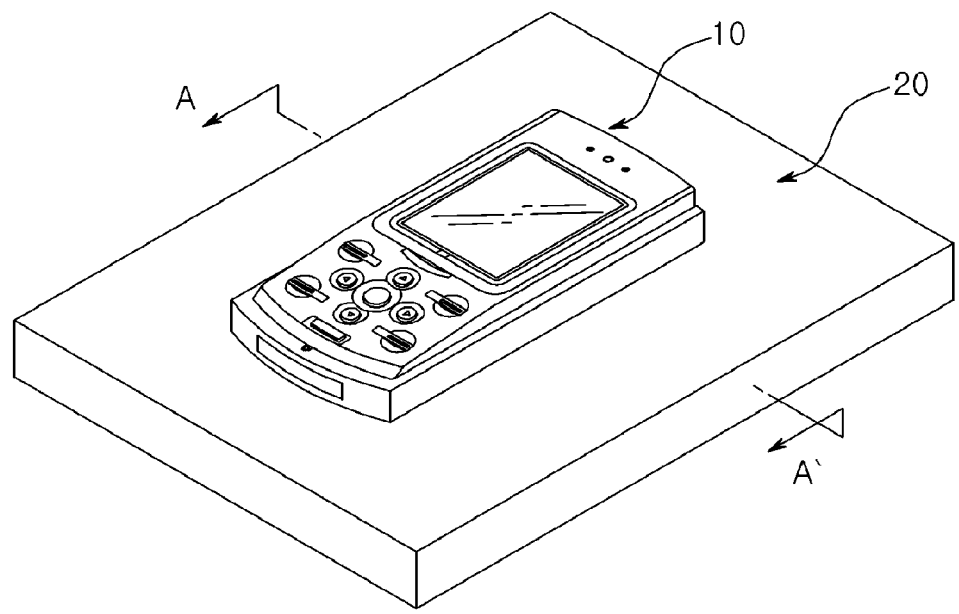
FIG. 1 is a perspective view schematically illustrating an electronic device according to an exemplary embodiment.

The terms and words used in the present specification and claims should not be interpreted as being limited to typical meanings or dictionary definitions, but should be interpreted as having meanings and concepts relevant to the technical scope based on the rule according to which an inventor can appropriately define the concept of the term to describe most appropriately the appropriate method he or she knows for carrying out the invention. Therefore, the configurations described in the embodiments and drawings are merely exemplary embodiments but do not represent all of the technical spirit. Thus, the application should be construed as including all the changes, equivalents, and substitutions included in the spirit and scope of the present disclosure at the time of filing this application.

Hereinafter, embodiments will be described in detail with reference to the accompanying drawings. At this time, it is to be noted that like reference numerals denote like elements in appreciating the drawings. Moreover, detailed descriptions related to well-known functions or configurations will be ruled out in order not to unnecessarily obscure the subject matter of the present disclosure. Based on the same reason, it is to be noted that some components shown in the drawings are exaggerated, omitted or schematically illustrated, and the size of each component does not exactly reflect its actual size.

Hereinafter, embodiments of the present disclosure will be described in detail with reference to the accompanying drawings. In describing exemplary embodiments, a contactless power transfer apparatus comprehensively refers to a contactless power transmission apparatus transmitting power and a contactless power reception apparatus receiving and storing power.

Figure 2:
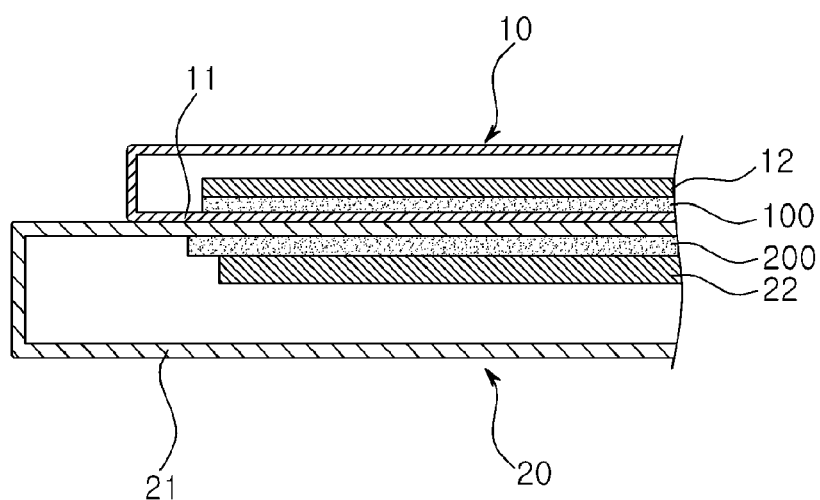
FIG. 2 is a cross-sectional view taken along line A-A' in FIG. 1.

FIG. 1 is a perspective view schematically illustrating an electronic device according to an exemplary embodiment, and FIG. 2 is a cross-sectional view taken along line A-A' in FIG. 1.

With reference to FIGS. 1 and 2, an electronic device according to the present embodiment may be a portable device 10 or a charging device 20, or may be a contactless power reception apparatus 100, or a contactless power transmission apparatus 200 provided in the portable device 10 or the charging device 20.

The portable device 10 may include a battery 12 and a contactless power reception apparatus 100 providing power to the battery 12 to charge the battery 12.

The battery 12 may be a rechargeable battery (or a secondary battery) and may be detachably attached to the portable device 10.

The contactless power reception apparatus 100 may be accommodated within a case 11 of the portable device 10 and directly attached to an inner surface of the case 11 or disposed to be as close as possible to the inner surface of the case 11.

Also, the charging device 20 according to the present embodiment is provided to charge the battery 12 of the portable device 10. To this end, the charging device 20 may include the contactless power transmission device 200 within the case 21.

The charging device 20 may convert household AC power provided from the outside into DC power, convert the DC power into an AC voltage having a particular frequency, and provide the converted AC voltage to the contactless power transmission device 200. To this end, the charging device 20 may include a voltage conversion unit 22 converting household AC power into an AC voltage of a particular frequency.

When the AC voltage is applied to a thin film coil (not shown) within the contactless power transmission device 200, a magnetic field around the thin film coil is changed. Then, a voltage based on the change in the magnetic field is applied to the contactless power reception apparatus 100 of the electronic device 10 disposed to be adjacent to the contactless power transmission device 200, and accordingly, the battery 12 is charged.

Hereinafter, the contactless power reception apparatus 100 provided in the portable device 10 will be described in detail.

Figure 3:
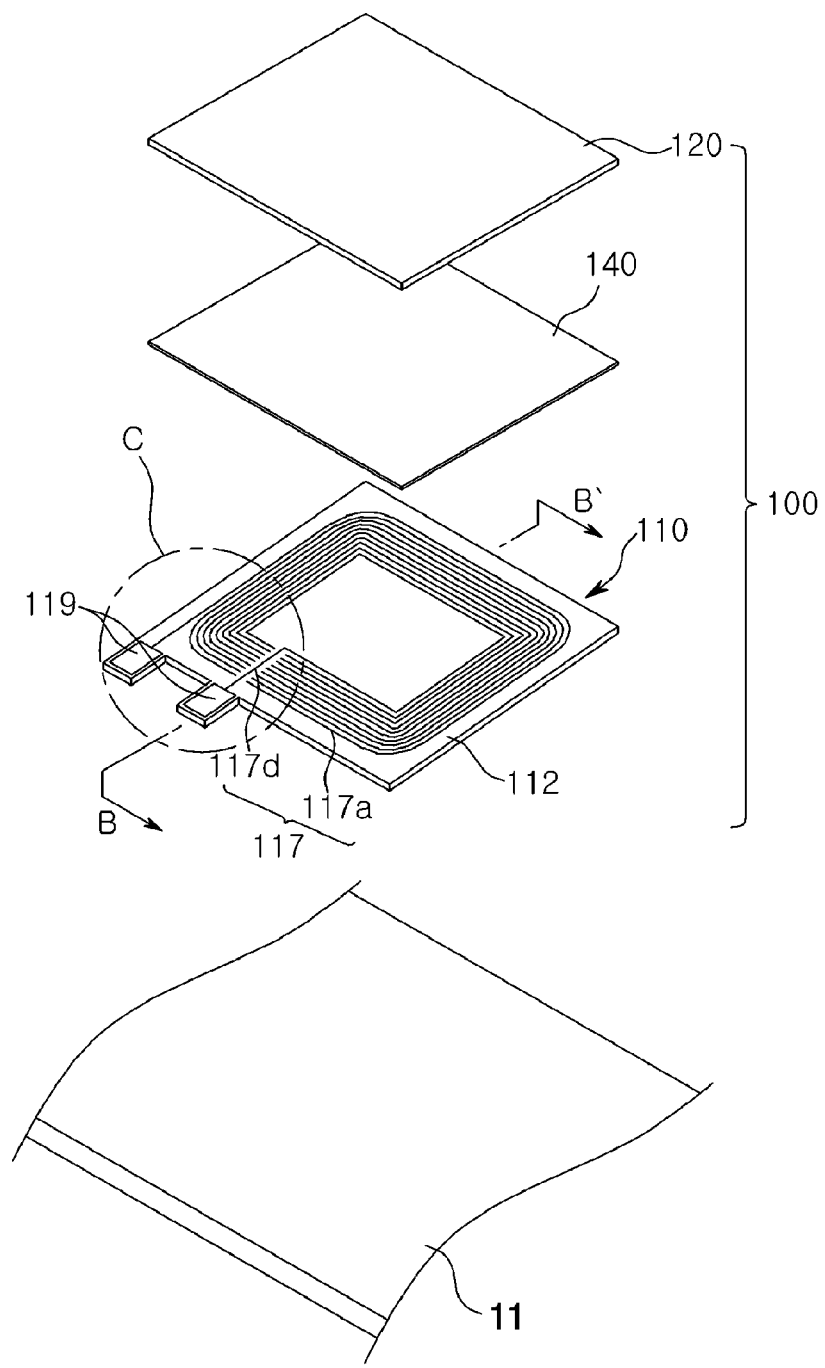
FIG. 3 is an exploded perspective view schematically showing a contactless power reception apparatus of FIG. 2.
Figure 4:
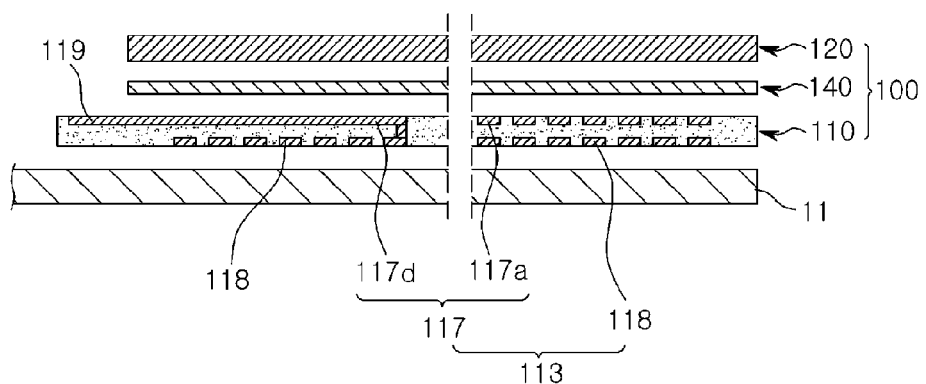
FIG. 4 is an exploded cross-sectional view taken along line B-B' in FIG. 3.
Figure 5:
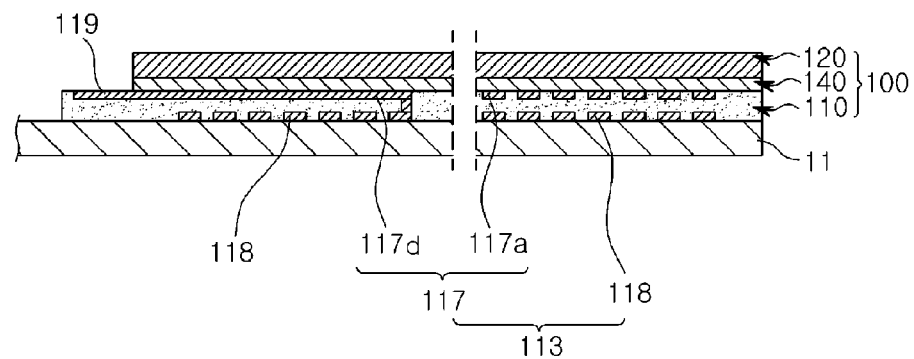
FIG. 5 is an assembled cross-sectional view of the contactless power reception apparatus of FIG. 4.

FIG. 3 is an exploded perspective view schematically showing a contactless power reception apparatus of FIG. 2. FIG. 4 is an exploded cross-sectional view taken along line B-B' in FIG. 3. FIG. 5 is an assembled cross-sectional view of the contactless power reception apparatus of FIG. 4.

With reference to FIGS. 3 through 5, the contactless power reception apparatus 100 may include a magnetic unit 120 and a thin film coil 110.

The magnetic unit 120 has a flat plate-like shape (or a sheet-like shape) and is disposed on one surface of the thin film coil 110 and fixedly attached to the thin film coil 110. The magnetic unit 120 is provided to effectively form a magnetic path of a magnetic field generated by coil patterns 113 of the thin film coil 110. To this end, the magnetic unit 120 may be formed of a material which is able to easily form a magnetic path, and specifically, a ferrite sheet may be used as a material of the magnetic unit 120.

However, the magnetic unit 120 is not limited to the foregoing configuration. Namely, variable applications maybe implemented; for example, ferrite powder or a magnetic solution may be applied to one surface of the thin film coil 110, or the like.

Meanwhile, although not shown, a metal sheet may be further added to an outer surface of the magnetic unit 120 as necessary in order to shield electromagnetic waves or leakage magnetic flux. The metal sheet may be formed of aluminum, or the like, but is not limited thereto.

Also, in the contactless power reception apparatus 100 according to the present embodiment, a bonding unit 140 may be interposed between the thin film coil 110 and the magnetic unit 120 in order to firmly fix and attach the thin film coil 110 and the magnetic unit 120.

The bonding unit 140 is disposed between the thin film coil 110 and the magnetic unit 120 and bonds the magnetic unit 120 and the thin film coil 110. The bonding unit 140 may be formed by a bonding sheet or a bonding tape, or an adhesive or a resin having adhesiveness may be applied to a surface of a substrate 112 or the magnetic unit 120. In this case, the bonding unit 140 may contain ferrite powder to have magnetism, along with the magnetic unit 120.

The thin film coil 110 may include the substrate 112 and the coil patterns 113 formed on the substrate 112.

The substrate 112 of the thin film coil 110 according to the present embodiment is a thin film substrate, which may be, for example, a flexible printed circuit board (FPCB). However, the substrate is not limited thereto and any substrate, such as a film, a thin PCB, or the like, may be variably used, as long as the substrate is relatively thin and is able to form a wiring pattern.

Figure 6:
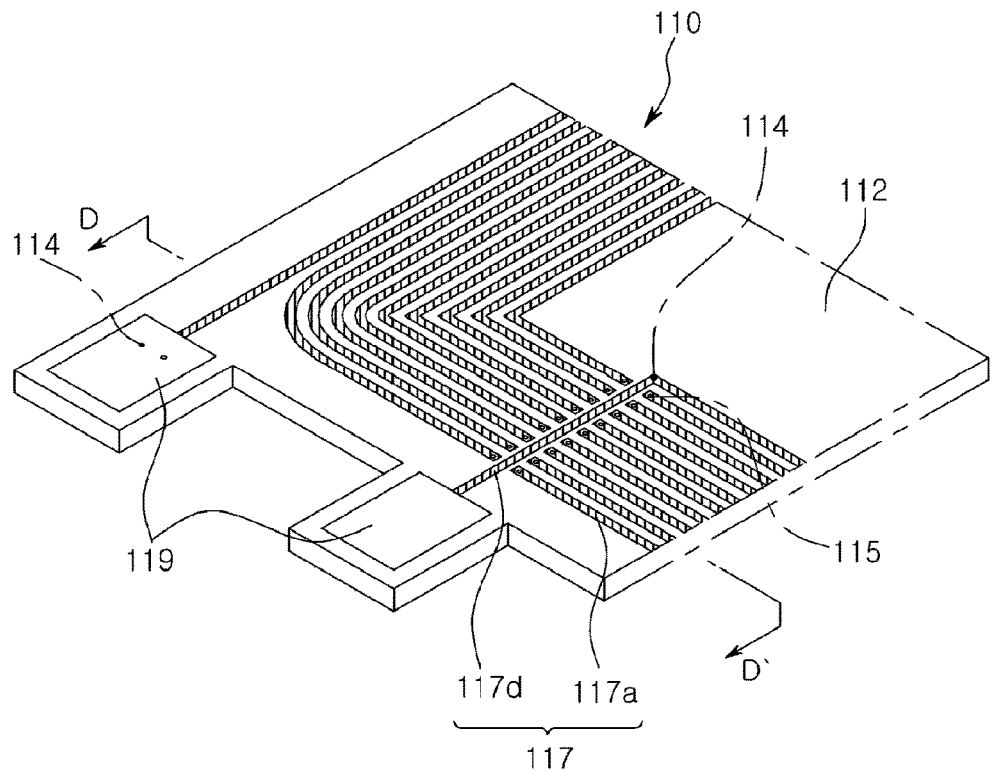
FIG. 6 is an enlarged partial perspective view showing a portion 'C' in FIG. 3.
Figure 7:
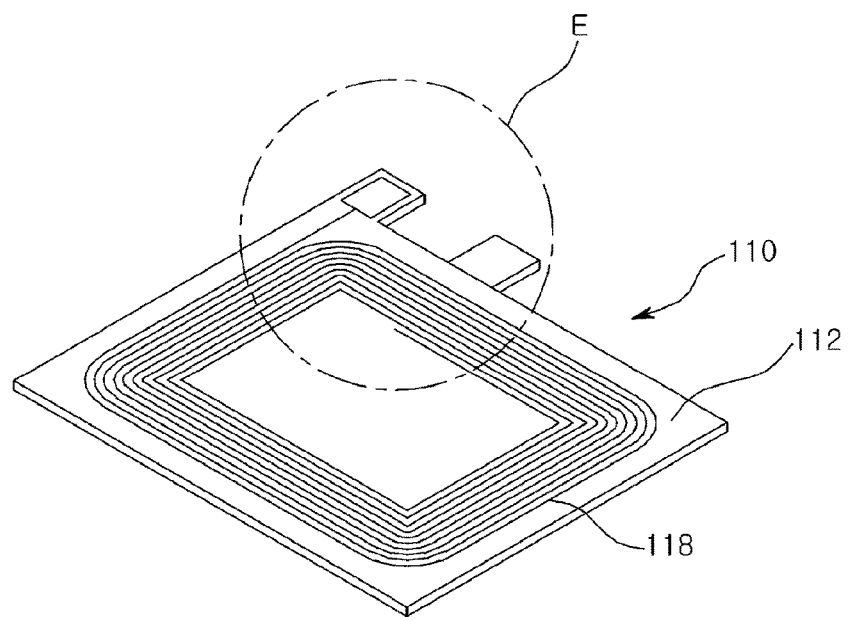
FIG. 7 is a perspective view showing a lower surface of a thin film coil according to an exemplary embodiment.
Figure 8:
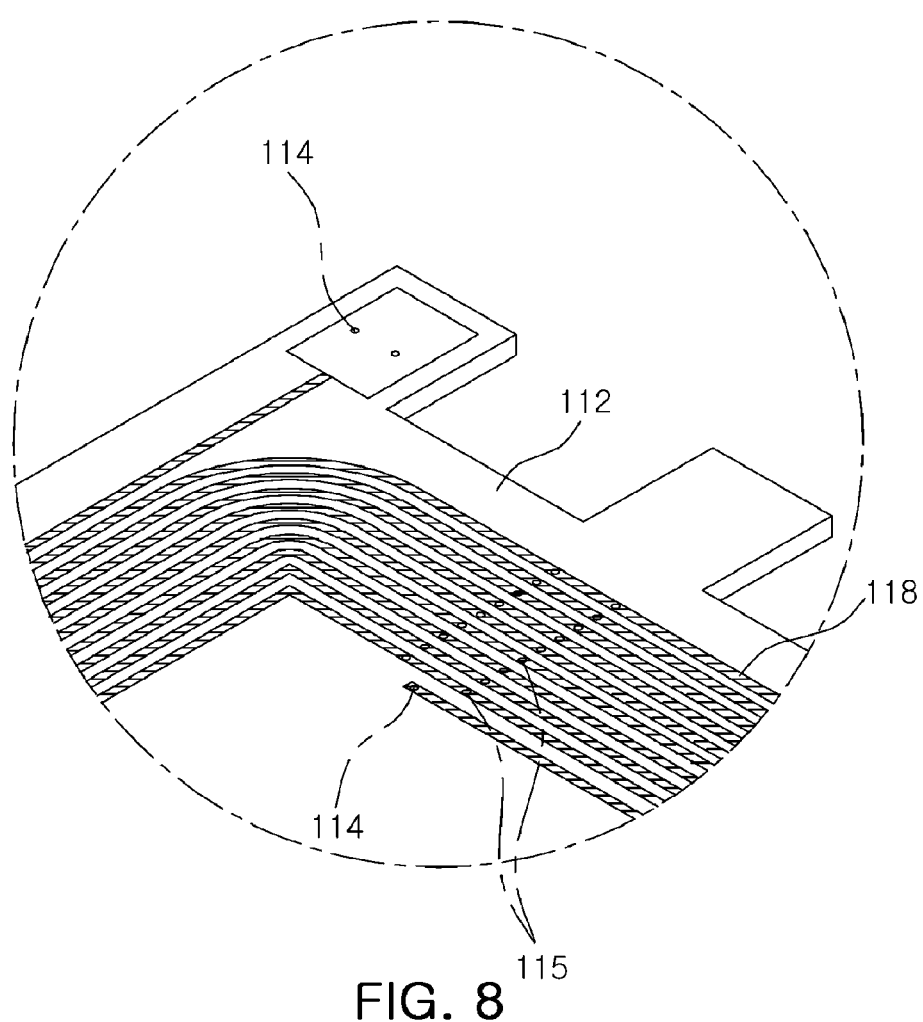
FIG. 8 is an enlarged partial perspective view showing a portion 'E' in FIG. 7.
Figure 9:
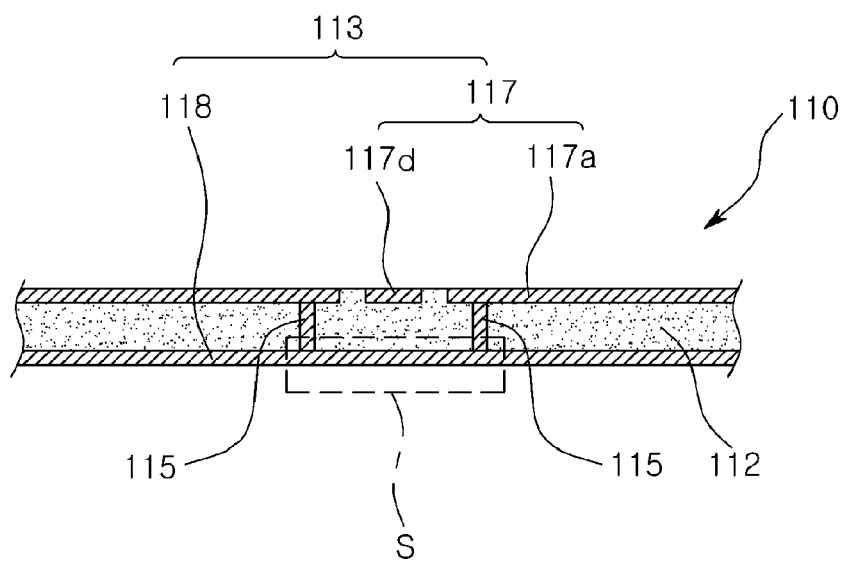
FIG. 9 is a partial cross-sectional view taken along line D-D' in FIG. 6.

FIG. 6 is an enlarged partial perspective view showing a portion 'C' in FIG. 3. FIG. 7 is a perspective view showing a lower surface of a thin film coil according to an exemplary embodiment. FIG. 8 is an enlarged partial perspective view showing a portion 'E' in FIG. 7. FIG. 9 is a partial cross-sectional view taken along line D-D' in FIG. 6.

With reference to FIGS. 6 through 9, the coil patterns 113 according to the present embodiment are formed as wiring patterns on both surfaces of the substrate 112, and may have a spiral shape on the plane formed by the substrate 112.

The coil patterns 113 may include a plurality of coil strands 117 and 118 disposed to be parallel. Here, the respective coil strands 117 and 118 maybe connected in parallel to form the single coil pattern 113. In the present embodiment, the coil strands 117 and 118 are formed on both surfaces of the substrate 112 to form the single coil pattern 113.

In order to connect the coil strands 117 and 118 in parallel, the thin film coil 110 according to the present embodiment may include a plurality of conductive connection vias 114. The connection vias 114 may electrically connect the coil strands 117 and 118 at both ends of the coil strands 117 and 118.

As illustrated in FIG. 6, in the present embodiment, a case in which the connection vias 114 are formed at inner ends of the spiral pattern 117a and contact pads 119 is taken as an example. However, the vias 114 are not limited thereto and the connection vias 114 may be formed at various positions, have various sizes, and various shapes according to the shape or structure of the coil pattern 113.

Also, according to the present embodiment, any one (e.g., the first coil strand 117) of the coil strands 117 and 118 formed on both surfaces of the substrate 112 may include a spiral pattern 117a and a lead out pattern 117d disposed to traverse the spiral pattern 117a from one end disposed within the spiral pattern 117a.

The lead out pattern 117d is provided to connect an end of the spiral pattern 117a to the outside of the coil pattern 113, namely, to the contact pad 119 as described hereinafter. Thus, the lead out pattern 117d is formed as a pattern electrically connecting the end of the spiral pattern 117a disposed at the innermost portion and the contact pad 119.

Accordingly, as shown in FIG. 9, the spiral pattern 117a of the first coil strand 117 is formed to gyrate based on the lead out pattern 117d at the portion in which the lead out pattern 117d is disposed. Namely, the spiral pattern 117a of the first coil strand 117 forms at least one gyration path going through the other surface of the substrate 112 in the portion in which the lead out pattern 117d is disposed, and thus, the spiral pattern 117a may maintain the coil shape without being interfered with by the lead out pattern 117d.

The gyration path (not shown) may be formed not to be in contact with a coil strand (hereinafter, referred to as a 'second coil strand') disposed on the other surfaces of the substrate 112. In this case, the gyration path may be disposed in a space between the second coil strands 118.

In this case, however, the entire area of the thin film coil may be increased due to the gyration path.

Thus, in the present embodiment, the thin film coil 110 forms the gyration path by using the second coil strand 118. Namely, in the present embodiment, the gyration path shares portions of the second coil strand 118.

As shown in FIGS. 6 through 9, conductive gyration vias 115 are disposed at portions of the spiral pattern 117a according to the present embodiment which are discontinued by the lead out pattern 117d. The first coil strand 117 is electrically connected to the second coil strand 118 byway of the gyration vias 115.

Thus, in the present embodiment, the single gyration path may include two gyration vias 115 and a portion (i.e., a shared section 'S' in FIG. 9) of the second coil strand 118 disposed between the gyration vias 115. The gyration paths by the number corresponding to the number of windings of the spiral pattern 117a may be formed.

Also, in the present embodiment, the first coil strand 117 and the second coil strand 118 of the coil pattern 113 are disposed on portions at which they are mutually projected by the medium of the substrate 112 (namely, at positions at which the first coil strand 117 and the second coil strand 118 correspond to each other in a vertical direction). Thus, when the gyration via 115 is formed to be perpendicular to the substrate 112, the first coil strand 117 and the second coil strand 118 may be easily electrically connected to mutually corresponding patterns by virtue of the gyration via 115.

With such a configuration, in the present embodiment, the first and second coil strands 117 and 118 of the coil pattern 113 are independently disposed on both surfaces of the substrate 112 up to a position in which the lead out pattern 117d is formed, but at the portion where the lead out pattern 117d is formed, the second coil strand 118 on the other surface of the substrate 112 is shared together.

Thus, the coil pattern 113 have a structure in which the respective coil strands 117 and 118 are electrically connected by the number of windings of the coil pattern 113 in the middle of the pattern, rather than having a structure in which the respective coil strands 117 and 118 are electrically connected only at both ends of the pattern.

Meanwhile, in the present embodiment, a case in which the lead out pattern 117d is formed at the first coil strand 117 formed on the upper surface of the substrate 112 is taken as an example. However, lead out pattern is not limited thereto and a lead out pattern maybe formed on a lower surface, rather than on an upper surface, of the substrate 112, namely, on the second coil strand 118.

Also, in the present embodiment, a case in which the respective coil strands 117 and 118 formed on both surfaces of the substrate 112 are formed at positions at which they are mutually projected by the medium of the substrate 112 is taken as an example, but is not limited thereto. Namely, the respective coil strands 117 and 118 formed on the respective surfaces of the substrate 112 may be formed in mutually deviated positions, rather than in mutually projected positions, or the like. Namely, the coil strands may be variably applied as necessary. In this case, the gyration via may be formed in an askew or stepwise manner, rather than to be perpendicular to the substrate, in order to connect the coil strands.

Also, in the present embodiment, the case in which the coil pattern 113 has a quadrangular spiral shape overall is taken as an example, but the spiral shape is not limited thereto and the coil pattern 113 may be variably applied. Namely, the coil pattern 113 may have a circular or polygonal spiral shape.

In addition, an insulating protective layer (e.g., a resin insulating layer (not shown)) may additionally be formed on an upper portion of the coil pattern 113 in order to protect the coil pattern 113 against the outside as necessary.

Meanwhile, the contact pad 119 may be formed at one side of the substrate 112, i.e., outwardly of the coil pattern 113, in order to electrically connect the coil pattern 113 to the outside.

Both ends of the coil pattern 113 may be supposed to be electrically connected to the contact pad 119, so at least two contact pads 119 may be provided.

Also, in the present embodiment, the contact pads 119 are disposed outwardly of the coil pattern 113. Here, although the contact pads 119 are disposed outwardly of the coil pattern 113, both ends of the coil pattern 113 in the thin film coil 110 according to the present embodiment maybe easily connected to the contact pads 119 through the foregoing gyration path and the lead out pattern 117d.

Also, as shown in FIG. 6, the contact pad 119 according to the present embodiment may be disposed to be protruded from the substrate 112 having a quadrangular shape. Thus, when the thin film coil 110 and the magnetic unit 120 are coupled, the contact pad 119 is exposed from the magnetic unit 120.

Thus, even after the thin film coil 110 according to the present embodiment is coupled to the magnetic unit 120, the coil pattern 113 and other components (e.g., a battery, a voltage conversion unit, or the like) may be easily electrically connected.

Meanwhile, in the present embodiment, the case in which the coil strand 117 or 118 is formed as a single strand is taken as an example, but the coil strand 117 or 118 is not limited thereto and the coil strand 117 or 118 maybe formed as multiple strands as in another embodiment as described hereinafter.

Also, in the thin film coil 110 according to the exemplary embodiment, the number of the coil strands 117 and 118 which may be formed on one surface of the substrate 112 may be determined according to the size of the substrate 112, i.e., the size of the electronic device.

Figure 10:
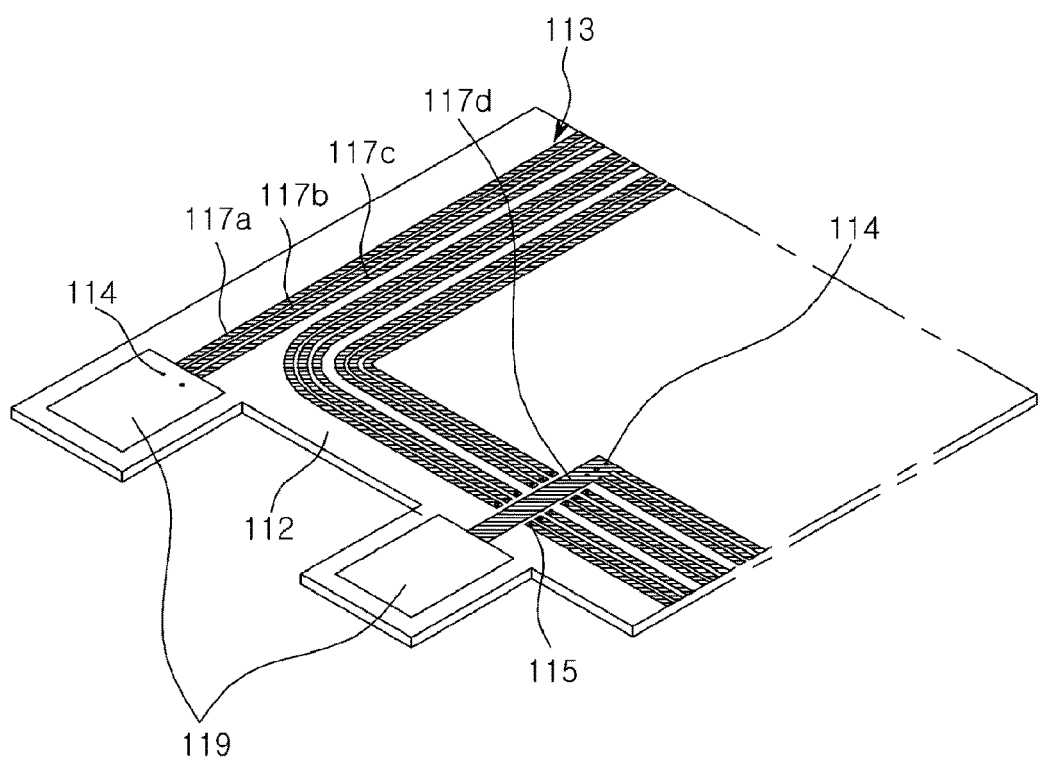
FIG. 10 is a perspective view schematically showing a thin film coil according to another exemplary embodiment.

Namely, when the substrate 112 is formed to have a relatively large size, a plurality of coil strands, rather than a single strand, may be formed on one surface of the substrate 112 as shown in FIG. 10, and when the substrate 112 is formed to have a relatively small size, only the single coil strand 117 or 118 as in the present embodiment may be formed on one surface of the substrate 112.

Although not shown, the contactless power reception apparatus 100 according to the present embodiment may further include a connection member electrically connecting the contact pad 119 of the thin film coil 110 to the battery 12 (in FIG. 2) of the electronic device in order to provide power generated from the coil pattern 113 of the thin film coil 110 to the battery 12.

The connection member may be a conductive wire or a thin film circuit board (e.g., an FPCB) within a wiring pattern formed therein.

In the contactless power reception apparatus 100 according to the present embodiment, since the coil pattern 113 is formed on the thin film substrate 112, rather than using a wire type coil as in the related art, the thin film coil 110 may be formed to be relatively very thin.

Also, the single coil pattern 113 is formed by the plurality of coil strands 117 and 118 connected in parallel. Thus, the coil pattern 113 according to the present embodiment is formed as a pattern on the substrate 112, but an effect of using a stranded wire type coil (e.g., Litz wire) formed by twisting several strands of wire may be achieved. The use of the stranded type coil may significantly reduce loss (e.g., an AC resistance value, etc.) made by an eddy current, a skin effect, or the like, at a low frequency.

In this manner, in the contactless power reception apparatus 100 according to the present embodiment, although the coil pattern 113 is formed to have a stranded wire form, the thickness of the thin film coil 110 may be significantly reduced (e.g., 0.1 mm or smaller), reducing the overall thickness of the contactless power reception apparatus 100.

In addition, in the contactless power reception apparatus 100 according to the present embodiment, the contact pads 119 of the thin film coil 110 are all disposed on lateral sides of the substrate 112. Also, an additional configuration for disposing the contact pads 119 on the lateral side of the substrate 112 is not required. This strength will be described as follows.

Among the contact pads 119 connected to both ends of the coil pattern 113, the contact pad 119 connected to the coil pattern 113 wound toward the interior (i.e., the center) of the coil pattern 113 may be disposed at the inner side of the coil pattern 113, rather than at an outer side thereof. In this case, the contact pad 119 disposed at the inner side of the coil pattern 113 should be electrically connected to the outside through a conductive wire, a connection board (e.g., an FPCB), or the like.

Also, in order to dispose the contact pads 119 outwardly of the coil pattern 113, a bridge formed of an insulating material maybe formed on the coil pattern 113 to forma pattern or a multilayer substrate formed by laminating several layers should be used as the substrate 112.

In this case, however, a fabrication time or fabrication costs are required to form the bridge on the substrate or fabricate a multilayer substrate, and the overall thickness of the substrate 112 is increased.

However, in the thin film coil 110 according to the present embodiment, the contact pads 119 may be disposed outwardly of the coil pattern 113 without using a multilayer substrate or a bridge. Thus, in comparison to the foregoing case, a fabrication time or fabrication costs may be reduced and the thickness of the thin film coil 110 or the contactless power reception apparatus 100 may be prevented from being increased.

Meanwhile, the configuration of the thin film coil 110 as described above may also be applied in the same manner to the contactless power transmission apparatus 200 provided in the charging device 20. Thus, a detailed description of the contactless power transmission apparatus 200 will be omitted.

Hereinafter, a thin film coil according to an exemplary embodiment has the same structure as that of the thin film coil (110 in FIG. 6) of the foregoing embodiment, except for a shape of a coil pattern. Thus, the same reference numerals will be used for the same components, a detailed description thereof will be omitted and the shape of the coil pattern will be described in detail.

FIG. 10 is a perspective view schematically showing a thin film coil according to another exemplary embodiment.

With reference to FIG. 10, the thin film coil 110 according to the present embodiment may include a thin film substrate 112 and the coil pattern 113 formed on the substrate 112, as in the foregoing embodiment.

The coil pattern 113 according to the present embodiment may include a plurality of coil strands 117a to 117c disposed in parallel. The plurality of coil strands 117a to 117c are electrically connected to the same contact pad 119. Accordingly, the respective coil strands 117a to 117c are connected in parallel to form a single coil pattern 113.

In the present embodiment, the case in which the coil pattern 113 is formed by three coil strands 117a to 117c on one surface of the substrate 112 is taken as an example. In this case, the respective coil strands 117a to 117c of the coil pattern 113 are spaced apart from each other at a certain interval and disposed to be parallel to each other.

As in the foregoing embodiment, the coil pattern 113 according to the present embodiment includes the lead out pattern 117d and a plurality of gyration vias 115. Thus, there is no need to use a multilayer substrate or a bridge, and the contact pads 119 may be disposed outwardly of the coil pattern 113 without increasing the thickness of the substrate 112, reducing the overall thickness of the thin film coil or the contactless power reception apparatus, shortening a fabrication time, and reducing fabrication costs.

Meanwhile, in FIG. 10, for example, the lead out pattern 117d is formed as a single coil strand, but the lead out pattern is not limited thereto and the lead out pattern 117d may also be formed as a plurality of coil strands like the other portions of the coil pattern 113.

Also, like the coil strands 117a to 117c formed on the upper surface of the substrate 112, a plurality of coil strands (not shown) may be formed on a lower surface of the substrate 112. However, the coil strands are not limited thereto, and only a single coil strand having a relatively large width maybe formed on the lower portion of the substrate 112. Namely, the coil strand may have various forms as necessary as long as the coil strands 117a to 117c formed on the upper surface of the substrate 112 may be electrically connected to the coil strand(s) of the lower surface of the substrate 112 through the gyration via 115.

As described above, the thin film coil and the electronic device having the same according to the exemplary embodiments are not limited to the foregoing embodiments and are variably applicable. For example, in the foregoing embodiments, the contact pads of the thin film coil are disposed in the same direction of the substrate, but the contact pads may be disposed at both sides of the substrate as necessary. Namely, the contact pads may be variably applicable.

Also, the thin film coil provided in the contactless power transmission apparatus of the electronic device is described as an example in the foregoing embodiments.

However, the thin film coil is not limited thereto and the thin film coil may be extensively applied to electronic components or electronic devices, such as a transformer, a motor, or the like, which employ a coil.

As set forth above, according to the exemplary embodiments, since a coil pattern is formed on a thin film substrate, rather than by using a wire type coil such as that of the related art, the thin film coil may be formed to be relatively very thin.

Also, since the single coil pattern is formed by the plurality of coil strands connected in parallel, an effect of using a stranded wire type coil (e.g., Litz wire) formed by twisting several strands of wire may be achieved. The use of the stranded type coil may significantly reduce a loss (e.g., an AC resistance value, etc.) caused by an eddy current, a skin effect, or the like, at a low frequency.

Also, in the thin film coil according to the present embodiment, the contact pads may be all disposed outwardly of the coil pattern without using a multilayer substrate or a bridge. Thus, a fabrication time or fabrication costs of the thin film coil maybe reduced, and the overall thickness of the thin film coil, an electronic device including the same, or the contactless power reception apparatus may be reduced.

While the present invention has been shown and described in connection with the embodiments, it will be apparent to those skilled in the art that modifications and variations may be made without departing from the spirit and scope of the invention as defined by the appended claims.

What is claimed is:

1. A thin film coil, comprising:
   a substrate having a first surface and a second surface and formed of an insulating layer;
   a first spiral pattern including a plurality of first coil strands formed spirally on the first surface of the substrate and having at least a portion electrically connected in parallel;
   a second spiral pattern including a plurality of second coil strands formed spirally on the second surface of the substrate and having at least a portion electrically connected in parallel, and electrically connected to the first spiral pattern;
   a first contact pad electrically connected to all ends disposed outwardly of the plurality of first coil strands;
   a second contact pad electrically connected to all ends disposed inwardly of the plurality of first coil strands;
   a lead out pattern formed on the first surface of the substrate, and leading out of the first spiral pattern from an end disposed on an inner side of the first spiral pattern; and
   a plurality of gyration vias passing through the substrate in a position adjacent to the lead out pattern, and connecting the first spiral pattern and the second spiral pattern.

2. The thin film coil of claim 1, wherein the first spiral pattern is disconnected and is connected to the second spiral pattern through the plurality of gyration vias in the position adjacent to the lead out pattern.

3. The thin film coil of claim 2, wherein the first spiral pattern and the second spiral pattern are connected to each other in parallel.

4. The thin film coil of claim 1, wherein at least a portion of the lead out pattern has a shape in which a plurality of strands are connected in parallel.

5. The thin film coil of claim 1, further comprising a conductive connection via disposed on an end disposed on an inner side of the second spiral pattern,
   wherein an end disposed on an inner side of the first spiral pattern and an end disposed on an inner side of the second spiral pattern are electrically connected by the conductive connection via.

6. The thin film coil of claim 1, wherein the first contact pad and the second contact pad are disposed outwardly of the first spiral pattern.

7. A wireless power receiving apparatus wirelessly receiving power transmitted by wireless power transmission apparatus to store the power in a battery, the wireless power receiving apparatus comprising:

a substrate having a first surface and a second surface and formed of an insulating layer;

a first spiral pattern including a plurality of first coil strands formed spirally on the first surface of the substrate and having at least a portion electrically connected in parallel;

a second spiral pattern including a plurality of second coil strands formed spirally on the second surface of the substrate and having at least a portion electrically connected in parallel, and electrically connected to the first spiral pattern;

a first contact pad electrically connected to all ends disposed outwardly of the plurality of first coil strands;

a second contact pad electrically connected to all ends disposed inwardly of the plurality of first coil strands;

a lead out pattern formed on the first surface of the substrate, and leading out of the first spiral pattern from an end disposed on an inner side of the first spiral pattern; and a plurality of gyration vias passing through the substrate in a position adjacent to the lead out pattern, and connecting the first spiral pattern and the second spiral pattern.

8. The wireless power receiving apparatus of claim 7, wherein at least a portion of the lead out pattern has a shape in which a plurality of strands are connected in parallel.

9. An electronic device comprising:
a wireless power receiving apparatus;
a battery storing power received by the wireless power receiving apparatus; and
a case to accommodate the wireless power receiving apparatus and the battery therein,
wherein the wireless power receiving apparatus comprises:
a substrate having a first surface and a second surface and formed of an insulating layer;
a first spiral pattern including a plurality of first coil strands formed spirally on the first surface of the substrate and having at least a portion electrically connected in parallel;
a second spiral pattern including a plurality of second coil strands formed spirally on the second surface of the substrate and having at least a portion electrically connected in parallel, and electrically connected to the first spiral pattern;
a first contact pad electrically connected to all ends disposed outwardly of the plurality of first coil strands;
a second contact pad electrically connected to all ends disposed inwardly of the plurality of first coil strands;
a lead out pattern formed on the first surface of the substrate, and leading out of the first spiral pattern from an end disposed on an inner side of the first spiral pattern; and
a plurality of gyration vias passing through the substrate in a position adjacent to the lead out pattern, and connecting the first spiral pattern and the second spiral pattern.

10. The electronic device of claim 9, wherein at least a portion of the lead out pattern has a shape in which a plurality of strands are connected in parallel.

11. A case assembly of a portable device wirelessly receiving power, the case assembly comprising:
a thin film coil; and
a case of the portable device disposed on the other side of the thin film coil,
wherein the thin film coil comprises:
a substrate having a first surface and a second surface and formed of an insulating layer;
a first spiral pattern including a plurality of first coil strands formed spirally on the first surface of the substrate and having at least a portion electrically connected in parallel;
a second spiral pattern including a plurality of second coil strands formed spirally on the second surface of the substrate and having at least a portion electrically connected in parallel, and electrically connected to the first spiral pattern;
a first contact pad electrically connected to all ends disposed outwardly of the plurality of first coil strands; and
a second contact pad electrically connected to all ends disposed inwardly of the plurality of first coil strands,
a lead out pattern formed on the first surface of the substrate, and leading out of the first spiral pattern from an end disposed on an inner side of the first spiral pattern; and
a plurality of gyration vias passing through the substrate in a position adjacent to the lead out pattern, and connecting the first spiral pattern and the second spiral pattern.

12. The case assembly of claim 11, wherein at least a portion of the lead out pattern has a shape in which a plurality of strands are connected in parallel.

\* \* \* \* \*